United States Patent
Pratt et al.

(10) Patent No.: US 8,676,181 B2
(45) Date of Patent: Mar. 18, 2014

(54) MOBILE PHONE NUMBER ANONYMIZER

(75) Inventors: James Pratt, Round Rock, TX (US); Marc Sullivan, Austin, TX (US); Sarah Peterson Everett, Cedar Park, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 290 days.

(21) Appl. No.: 12/647,540

(22) Filed: Dec. 27, 2009

(65) Prior Publication Data
US 2011/0159861 A1   Jun. 30, 2011

(51) Int. Cl.
*H04M 1/66*   (2006.01)
*H04M 3/42*   (2006.01)
*H04B 7/00*   (2006.01)

(52) U.S. Cl.
USPC ............................ 455/417; 455/410; 455/517

(58) Field of Classification Search
USPC ........... 455/414.1, 414.4, 415, 417–419, 458, 455/460–463, 517, 550.1, 556.2, 561, 564, 455/410–411, 456.1–456.6; 379/201.11–201.12, 210.02, 379/211.01–211.02, 216.01, 218.01, 379/201.02; 705/64, 74, 78
See application file for complete search history.

(56) References Cited

U.S. PATENT DOCUMENTS

| | | | | |
|---|---|---|---|---|
| 5,590,184 | A * | 12/1996 | London | 379/142.09 |
| 5,933,785 | A * | 8/1999 | Tayloe | 455/558 |
| 6,157,829 | A * | 12/2000 | Grube et al. | 455/414.1 |
| 6,327,353 | B1 * | 12/2001 | Fukuzawa et al. | 379/201.01 |
| 6,938,022 | B1 * | 8/2005 | Singhal | 705/74 |
| 7,013,132 | B2 * | 3/2006 | Kehr | 455/415 |
| 7,027,575 | B1 * | 4/2006 | Burgess | 379/201.01 |
| 7,469,043 | B1 * | 12/2008 | McDonald et al. | 379/202.01 |
| 7,944,870 | B2 * | 5/2011 | Varland | 370/313 |
| 8,031,871 | B2 * | 10/2011 | Beaudou et al. | 380/247 |
| 2003/0055723 | A1 * | 3/2003 | English | 705/14 |
| 2004/0101123 | A1 * | 5/2004 | Garcia | 379/220.01 |
| 2005/0032546 | A1 * | 2/2005 | Kehr | 455/551 |
| 2007/0155435 | A1 * | 7/2007 | Billmaier et al. | 455/565 |
| 2008/0052527 | A1 * | 2/2008 | Siedlarz | 713/186 |
| 2008/0084982 | A1 * | 4/2008 | Chatterjee | 379/201.01 |
| 2008/0318549 | A1 * | 12/2008 | Skubic et al. | 455/411 |
| 2012/0100830 | A1 * | 4/2012 | Barber et al. | 455/410 |

FOREIGN PATENT DOCUMENTS

EP   2 109 301 A1 * 10/2009 ............. H04M 3/42
WO   WO 03/094475 A1 * 11/2003 ............. H04L 29/06

* cited by examiner

Primary Examiner — Meless Zewdu (57) ABSTRACT

A method, computer readable media and apparatus for temporarily mapping an anonymous number to a mobile endpoint device are disclosed. For example, the method assigns a first temporary anonymous number to a mobile endpoint device having a mobile number, and receives a call request to reach the mobile endpoint device in accordance with the first temporary anonymous number. The method forwards the call request to the mobile endpoint device if the first temporary anonymous number has not expired.

19 Claims, 4 Drawing Sheets

MOBILE PHONE NUMBER ANONYMIZER

The present disclosure relates generally to communication networks and, more particularly, to systems and methods for temporarily mapping an anonymous number to a mobile endpoint device.

BACKGROUND

Vendors such as restaurants, supermarkets, coffee shops and other third-party vendors presently use several methods for establishing temporary communication with patrons. For example, a patron may walk into a restaurant and there is a wait to sit down. In some cases, the restaurant may give the patron a pager so that the restaurant can notify the patron when the table is ready. Thus, the patron does not need to be confined to the waiting area but can go off somewhere else. Similarly, many supermarkets use a system at the deli counter where patrons take a ticket with a number from a dispenser and the deli counter serves patrons in the order of the ticket numbers. The deli counter may call out the number that it is currently being served and/or may display the number currently being served on an overhead display. As another example, a coffee shop or fast food restaurant may take a patron's name along with his or her order. The patron may then wait, usually within the establishment itself, until the order is ready. The restaurant or coffee shop may simply call out the patron's name indicating that his or her order is ready. In some instances the restaurant or coffee shop may use a loudspeaker system to inform patrons of their orders, thereby allowing patrons just a bit of mobility, i.e., without having to wait in front of a counter.

Each of the foregoing examples permits a certain level of mobility to the patron while he or she waits for the order or the table to become ready. However, all the examples still require a patron to remain in very close proximity to the vendor in order to maintain communication. Out of all of the above examples, the restaurant providing a pager may provide the greatest mobility to the patron while he or she waits. Still, most restaurants restrict the operable range of the pagers to within a few hundred feet, which can still be inconvenient for a patron facing a long wait. In addition, this still requires the restaurant to purchase and to maintain a system of many pagers.

Vendors such as restaurants, florists, coffee shops, bakeries, caterers, electronics retailers, and many others may also permit patrons to place orders in advance, such as by calling ahead, or submitting an order online or via facsimile, in order that the patrons do not have to wait for their food/merchandise to be prepared or brought out from a storage area. Nevertheless, in some instances a patron may demand an even greater level of preparedness on the part of the vendor. For example, the patron may change his or her schedule and decide they would like to take a meal or pick up merchandise earlier or later. Conversely, the vendor may be extremely busy and would prefer to prepare the patron's order at the last possible minute, while still having the order ready when the patron arrives. However, the established practice of calling ahead may not be adequate to handle such demands.

SUMMARY

In one embodiment, the present disclosure discloses methods, computer readable media and apparatuses for temporarily mapping an anonymous number to a mobile endpoint device. For example, the method assigns a first temporary anonymous number to a mobile endpoint device having a mobile number, and receives a call request to reach the mobile endpoint device in accordance with the first temporary anonymous number. The method forwards the call request to the mobile endpoint device if the first temporary anonymous number has not expired.

In one alternate embodiment, the method assigns a first temporary anonymous number to a mobile endpoint device having a mobile number, and receives a request for location information for the mobile endpoint device in accordance with the first temporary anonymous number. The method provides the location information for the mobile endpoint device if the first temporary anonymous number has not expired.

In yet another alternate embodiment, the method receives a first temporary anonymous number by the mobile endpoint device, wherein the mobile endpoint device has a mobile number. The method sends the first temporary anonymous number by the mobile endpoint device wirelessly to another device.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses methods, computer readable media and apparatuses for temporarily mapping an anonymous number to a mobile endpoint device. For example, a network provider may provide users with the option to subscribe to a temporary anonymous number service feature. In one embodiment, a method assigns a temporary anonymous number (e.g., a phone number) to a subscriber who has subscribed to the temporary anonymous number service feature that may be given out and used to reach the subscriber's mobile endpoint device for a certain period of time. Advantageously, the use of a temporary anonymous number in this manner allows a subscriber to make himself or herself reachable to others while at the same time maintaining the confidentiality of his or her permanent mobile phone number (broadly a mobile endpoint number). Thus, a subscriber who does not actually want to give out his or her mobile number to a third-party, such as a business/vendor due to privacy or security concerns and similar issues, but would like to have the ability to establish two way communications with one or more third-parties for a certain limited period of time, are able to do so in a convenient manner.

For example, a subscriber may walk into a third-party establishment (e.g., a restaurant) which has a wait to sit down. The subscriber may then request and be assigned by the method a temporary anonymous number that the restaurant can use to reach the subscriber. When there is a table available, the restaurant may then contact the subscriber's mobile endpoint device using the temporary anonymous number. In this manner, the subscriber's permanent mobile number is not provided to the restaurant, but yet, the restaurant is still able to reach the subscriber via the subscriber's mobile endpoint device. It should be noted that the restaurant does not have to deploy a paging system, and the subscriber does not have to carry yet another device provided by the restaurant.

Notably, the restaurant need not know that the number it has been given and which it uses to reach the subscriber is a temporary anonymous number rather than the subscriber's permanent number. Furthermore, the subscriber's mobile endpoint device maintains its originally assigned mobile number (or other identification, such as a URI (uniform resource identifier) or user identification (UID)). Thus, the mobile endpoint device can still be reached by others to whom the subscriber has given the permanent number (e.g., family, friends, and trusted persons). The use of the temporary anonymous number in this manner allows mobile endpoint devices, such as cell phones to mimic functions of other devices that are used in other types of systems. For example, in one embodiment, the method enables a cell phone to be used in the same manner as pagers that are used by restaurants, while at the same time addressing security risks and concerns that many have about giving out their cell phone numbers. Notably, the vendors and/or their point-of-sale devices never actually see the permanent number of the patron's mobile endpoint device.

In addition, in one embodiment, it would be advantageous to provide detailed location information on patrons to vendors in order for the vendors to better fulfill patrons' orders, e.g., on a just-in-time basis. Accordingly, certain embodiments enable the temporary anonymous number to be used by a vendor to obtain location information pertaining to a patron's mobile endpoint device. However, because of security and privacy concerns, it is contemplated that temporary anonymous numbers will expire, e.g., after a predetermined time interval, after a number of uses, or upon a subscriber's request. In this manner, a patron (e.g., a subscriber) will enable a vendor to obtain location information or establish communications with the patron that are necessary to fulfill an order and/or complete a transaction, but will protect the patron from unsolicited tracking and communications outside the desired transaction or time period.

Although the present disclosure is discussed below in the context of wireless access networks and packet networks, e.g., Internet Protocol (IP) Multimedia Subsystem (IMS) networks, the present disclosure is not so limited. Namely, the present disclosure can be applied to packet switched or circuit switched networks in general, e.g., Voice over Internet Protocol (VoIP) networks, Service over Internet Protocol (SoIP) networks, Asynchronous Transfer Mode (ATM) networks, Frame Relay networks, cellular networks, wireless networks, and the like.

Figure 1:
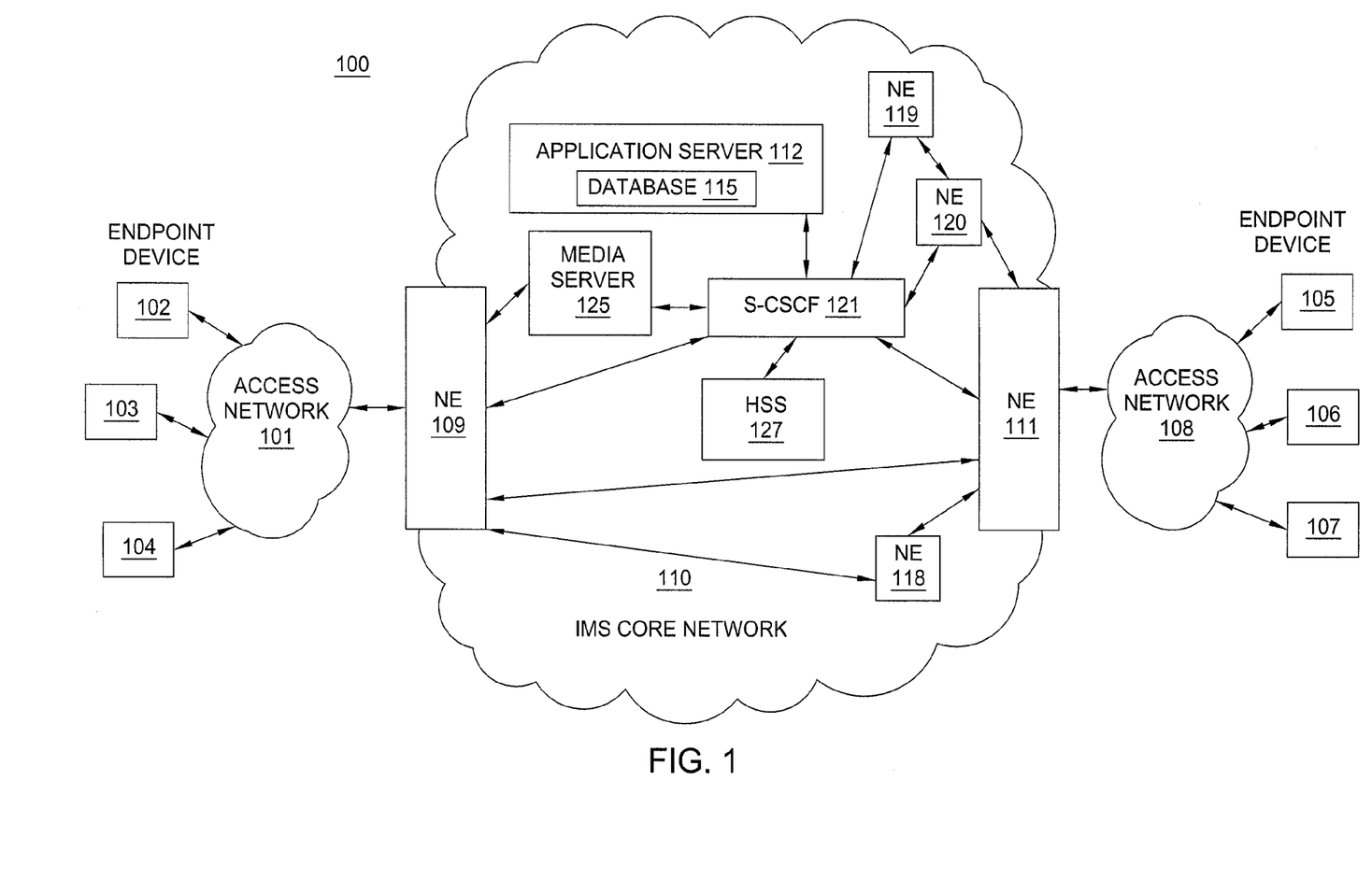
FIG. 1 illustrates an exemplary network related to the present disclosure.

To better understand the present disclosure, FIG. 1 illustrates an example network 100, e.g., an Internet Protocol (IP) Multimedia Subsystem network related to the present disclosure. An IP network is broadly defined as a network that uses Internet Protocol to exchange data packets. Exemplary IP Multimedia Subsystem (IMS) networks include Internet protocol (IP) networks such as Voice over Internet Protocol (VoIP) networks, Service over Internet Protocol (SoIP) networks, and the like.

In one embodiment, the network 100 may comprise a plurality of endpoint devices 102-104 configured for communication with the core IMS network 110 (e.g., an IP based core backbone network supported by a service provider) via an access network 101. Similarly, a plurality of endpoint devices 105-107 are configured for communication with the IMS core packet network 110 via an access network 108. The network elements 109 and 111 may serve as gateway servers or edge routers for the network 110.

The endpoint devices 102-107 may comprise user endpoint devices such as personal computers, laptop computers, Personal Digital Assistants (PDAs), mobile phones, cellular phones, smart phones, email devices, messaging devices, and the like. For example, each of the endpoint devices may comprise a subscriber's mobile endpoint device (e.g., a mobile phone, cell phone, smart phone, and the like) or a vendor/third-party's endpoint device (e.g., a point-of-sale (POS) terminal or a computer), as will be described in greater detail below. The access networks 101 and 108 serve as a conduit to establish a connection between the endpoint devices 102-107 and the Network Elements (NEs) 109 and 111 of the IMS core network 110. The access networks 101 and 108 may each comprise a Digital Subscriber Line (DSL) network, a broadband cable access network, a Local Area Network (LAN), a Wireless Access Network (WAN), a $3^{rd}$ party network, and the like. The access networks 101 and 108 may be either directly connected to NEs 109 and 111 of the IMS core network 110, or indirectly through another network.

Some NEs (e.g., NEs 109 and 111) reside at the edge of the IMS core infrastructure and interface with customer endpoints over various types of access networks. An NE that resides at the edge of a core infrastructure is typically implemented as an edge router, a media gateway, a proxy server, a border element, a firewall, a switch, and the like. An NE may also reside within the network (e.g., NEs 118-120) and may be used as a SIP server, a core router, or like device.

The IMS core network 110 also comprises a Home Subscriber Server (HSS) 127, a Serving-Call Session Control Function (S-CSCF) 121, a Media Server 125, and an Application Server 112 that contains a database 115. An HSS 127 refers to a network element residing in the control plane of the IMS network that acts as a central repository of all customer specific authorizations, service profiles, preferences, etc.

The S-CSCF 121 resides within the IMS core infrastructure and is connected to various network elements (e.g., NEs 109 and 111) using the Session Initiation Protocol (SIP) over the underlying IMS based core backbone network 110. The S-CSCF 121 may be implemented to register users and to provide various services (e.g., VoIP services). The S-CSCF interacts with the appropriate VoIP/SoIP service related applications servers (e.g., 112) when necessary. The S-CSCF 121 performs routing and maintains session timers. The S-CSCF may also interrogate an HSS to retrieve authorization, service information, user profiles, etc. In order to complete a call that requires certain service specific features, the S-CSCF may need to interact with various application servers (e.g., various VoIP servers). For example, the S-CSCF may need to interact with another server for translation of an E.164 voice network address into an IP address, and so on.

The Media Server (MS) 125 is a special server that typically handles and terminates media streams to provide services such as announcements, bridges, and Interactive Voice Response (IVR) messages for VoIP service applications. The MS 125 also interacts with customers for media session management to accomplish tasks such as process requests.

The application server 112 may comprise any server or computer that is well known in the art, and the database 115 may be any type of electronic collection of data that is also well known in the art. In one embodiment, the application server 112 may be configured to temporarily map anonymous numbers to mobile endpoint devices. Accordingly, in one embodiment the database 115 may store a list of mobile endpoint device numbers and a list of anonymous numbers to support and enable the temporary mapping of anonymous numbers to mobile endpoint devices, as discussed in greater detail below.

The above IP network is only described to provide an illustrative environment in which packets for voice, data and/or multimedia services are transmitted on networks. It should be noted that the communication system 100 may be expanded by including additional endpoint devices, access networks, network elements, application servers, etc. without altering the scope of the present disclosure.

Figure 2:
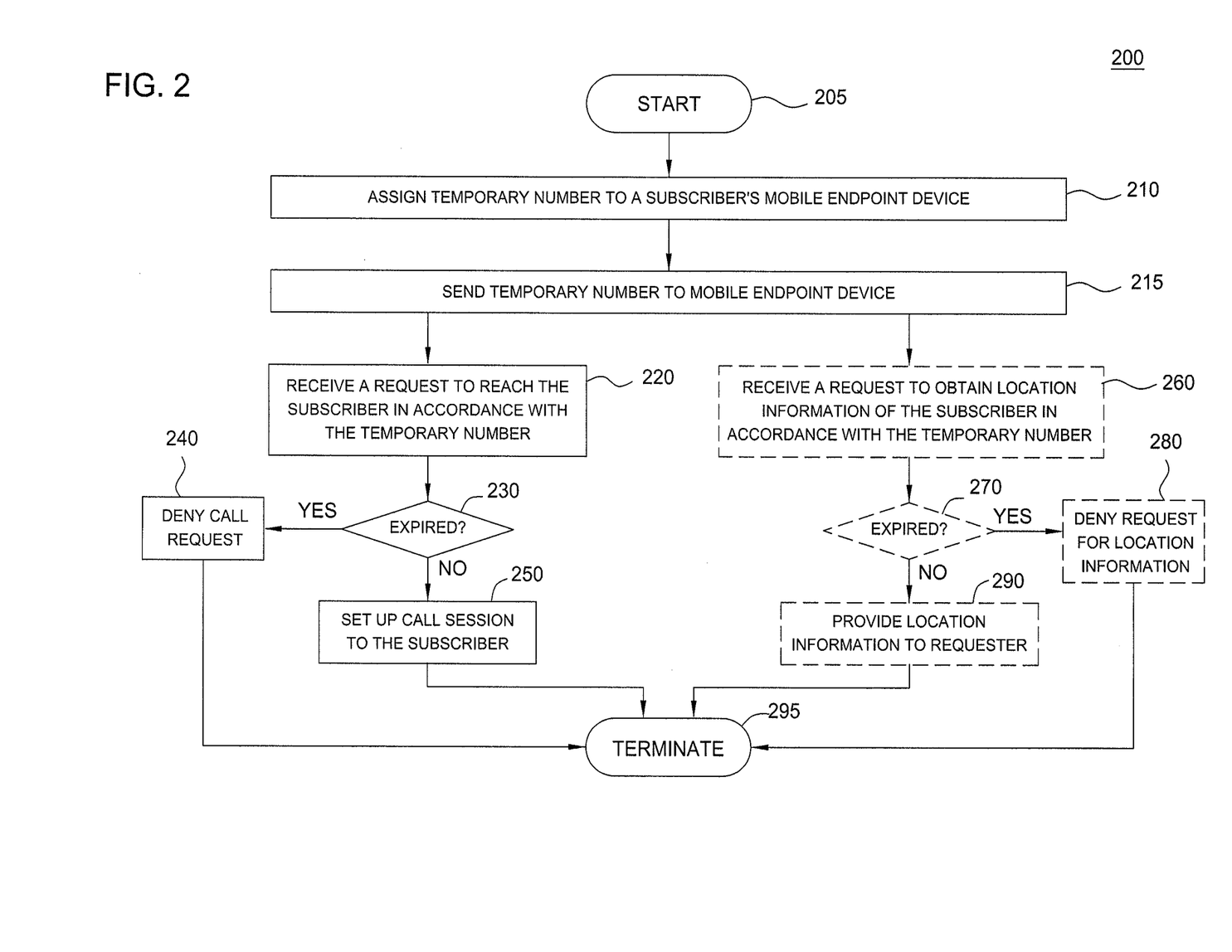
FIG. 2 illustrates a flowchart of a method for temporarily mapping an anonymous number to a mobile endpoint device.

FIG. 2 illustrates a flowchart of a method 200 for mapping an anonymous number to a mobile endpoint device. In one embodiment, one or more steps of the method 200 can be performed by one or more of the components of the core network 110 and/or access networks 101 and 108, which may comprise wireless access networks. For example, in one embodiment one or more steps of the method 200 can be implemented by S-CSCF 121 or an application server such as AS 112. The method begins in step 205 and proceeds to step 210.

At step 210, the method assigns a temporary anonymous number to a user's mobile endpoint device. For example, in one embodiment the method 200 may maintain a mapping between a temporary anonymous number and the permanent number associated with a subscriber's mobile endpoint device to which the anonymous number is assigned (e.g., via a database such as DB 115 in FIG. 1). The database may store many such records associating each of a plurality of temporary anonymous numbers with a respective mobile endpoint device. In addition, the database may store a pool of temporary anonymous numbers not currently in use that are available for assignment. Accordingly, in one embodiment the method may then select a temporary anonymous number to be assigned from the pool of available temporary anonymous numbers. For example, a temporary anonymous number (777)-777-7777 can be assigned to a mobile endpoint device that currently has a mobile number of (777)-111-1111.

In one embodiment, the method assigns a temporary anonymous number randomly (e.g., from a pool of available temporary anonymous numbers). In one embodiment, the pool of available temporary anonymous numbers includes all or a portion of the available numbers that are currently unused as permanent numbers for endpoint devices and other network devices. In one embodiment, the method assigns a temporary anonymous number containing an area code that corresponds to the current geographic area in which the mobile endpoint device is located. In another embodiment, the method assigns a temporary anonymous number with an area code that is the same as the area code of the permanent number of the mobile endpoint device.

In one embodiment, the temporary anonymous number is an SMS (Short Message Service) mapped quick code (e.g., a short code, a long code, etc.) or any messaging number, code, device identifier (ID), or user ID that could facilitate wireless communication with a mobile endpoint device, such as MMS (Multimedia Messaging Service) code and a phone number, for example.

In one embodiment, the method assigns a temporary anonymous number in response to a request (e.g., from a subscriber who has subscribed to a temporary anonymous number service feature). In another embodiment, the method assigns a temporary anonymous number according to a schedule. For example, the method may assign a new temporary anonymous number to a mobile endpoint device for a subscriber to use each day, each week, or any other time period. In still another embodiment, the method may assign a temporary anonymous number when a previously assigned temporary anonymous number has expired. For example, a mobile endpoint device may be assigned a temporary anonymous number that is effective only for five uses (or any other number of uses as the subscriber and/or a network provider may specify, e.g., a single use, ten uses, etc.).

To illustrate, the subscriber may receive four phone calls at his or her mobile endpoint device in accordance with the temporary anonymous number. The subscriber may then enter a restaurant with a wait for a table and provide the temporary anonymous number to the restaurant. When a table is available, the restaurant may contact the subscriber at his or her mobile endpoint device using the temporary anonymous number. Since this is the fifth use of the temporary anonymous number, during or at the completion of the call, the method may then assign a new temporary anonymous number which can be used to reach the subscriber's mobile endpoint device. For example, the new temporary anonymous number may be good for another five uses, after which it will expire and yet another new temporary anonymous number may be assigned by the method.

In one embodiment, the user may specify how many uses the new temporary anonymous number to be assigned should have. Alternatively, or in addition, the user may specify the duration the temporary anonymous number assigned should have. In one embodiment, the user may request that the temporary anonymous number assigned by the method to have a particular area code, which may be the area code in which the subscriber's mobile endpoint device is currently located, the subscriber's home area code, or any other area code. This option allows a subscriber to appear to have a presence in an area that the subscriber is not otherwise connected to.

Following step 210, the method 200 proceeds to step 215 where the method optionally sends a temporary anonymous number to a subscriber's mobile endpoint device. In one embodiment, after the method assigns a temporary anonymous number in step 210, the method may notify the subscriber of the temporary anonymous number assignment, e.g., via a text message, an automated voicemail, a SMS message and/or MMS message to the subscriber's mobile endpoint device. In this manner, the subscriber may begin to use the temporary anonymous number and provide the temporary anonymous number to third-parties with whom the subscriber wishes to establish two-way communications for a certain limited period of time. Alternatively, a code representative of the temporary anonymous number can be provided to the subscriber's mobile endpoint device. In this manner, the code can be exchanged by the subscriber without the need to provide the temporary anonymous number. The mapping of the code to the temporary anonymous number can be maintained by the network service provider.

After sending a temporary anonymous number to a subscriber's mobile endpoint device at step 215, the method may proceed to step 220, or alternatively, may proceed to step 260.

At step 220, the method 200 receives a call request to reach the user in accordance with the temporary anonymous number. For example, a subscriber may walk into a third-party establishment (e.g., a restaurant) which has a wait to sit down. The subscriber having been assigned a temporary anonymous number at step 210, may provide with the temporary anonymous number to the third-party establishment. In other words, the subscriber may give out the temporary anonymous number to the restaurant to use in contacting the subscriber when a table becomes available. At step 220, the restaurant may dial the temporary anonymous number to inform the subscriber that his or her table is now available.

In one alternate embodiment, a vendor or third-party, such as a restaurant, may have a number which a user can dial upon entering the establishment that will trigger a method to provide the user with a temporary anonymous number. For example, a business could subscriber to a service having a number (e.g., an 800 number or a 4-5 digit SMS quick code/short code service), which when dialed invokes a method to provide/disseminate a temporary anonymous number to the dialing mobile endpoint device. This process may be managed by a communication network service provider via a server (e.g., AS 112 in FIG. 1). Advantageously, this would maintain the anonymity of the subscriber requesting the temporary anonymous number vis-à-vis a vendor, while allowing the vendor to bear the cost of the service for its patrons.

In any event, the restaurant may then attempt to contact the subscriber's mobile endpoint device using the temporary anonymous number when a table is available. For example, the restaurant may send a call setup signaling message (e.g., via its own terminal device, such as a telephone), or any other suitable signaling message, requesting to establish two way communication in accordance with the temporary anonymous number. Accordingly, the method may receive a call setup signaling message directed to the temporary anonymous number in a called party user ID field. In turn, the method will identify or correlate a mobile endpoint device associated with the temporary anonymous number (as well as the service logic to reach the mobile endpoint device). In one embodiment, the method consults a database which may contain a mapping (e.g., in a table or other suitable data structure) between temporary anonymous numbers and the permanent numbers (or other identifiers) of the mobile endpoint devices to which they are currently assigned. In one embodiment, the call request may alternatively comprise a text message, SMS message, MMS message, or other type of data call or communication.

At step 230, the method 200 determines whether the temporary anonymous number received in the step 220 has expired. For example, in one embodiment a temporary anonymous number assigned to a mobile endpoint device has an expiration of five uses. Thus, if a third-party is attempting to reach a subscriber using the temporary anonymous number, but five previous attempts to call the subscriber using the temporary anonymous number have already been made, the method may determine that the temporary anonymous number assignment to the subscriber's mobile endpoint device has expired. It should be noted that the expiration period for the temporary anonymous number can be defined in various ways. In one embodiment, the method may store one or more parameters associated with the expiration of a temporary anonymous number. For instance, DB 115 may contain a table or other suitable data structure storing various fields such as the number of instances that the temporary anonymous number has been used, a predefined time period that the temporary anonymous number will be effective (e.g., the number of hours, the number of days, the days of the week, and so on), the area code of the calling party (e.g., the temporary anonymous number is only effective for calls made from area code (777)-xxx-xxx), and so on.

If the method 200 determines at step 230 that the temporary anonymous number is expired, the method proceeds to step 240 where the call request is denied. For example, in one embodiment the method may provide a call failure notification to the caller (for example, a restaurant attempting to reach a subscriber using an expired temporary anonymous number will be notified that the number is no longer in service).

Following step 240, the method terminates at step 295. However, if at step 230 the method 200 determines that the temporary anonymous number has not expired, the method proceeds to step 250.

At step 250, the method 200 completes the call request to the subscriber's mobile endpoint device. In one embodiment, the method uses the mapping between the temporary anonymous number and the permanent number of the subscriber's mobile endpoint device obtained to set up the call session to the subscriber.

For example, in FIG. 1 endpoint device 102 may comprise a subscriber's mobile endpoint device and endpoint device 105 may comprise an endpoint device of a restaurant to which the subscriber has provided his or her temporary anonymous number. The subscriber may have been waiting for a table to become available and is expecting a call from the restaurant. Accordingly, when a table becomes available the restaurant, via endpoint device 105 may attempt to contact the subscriber in accordance with the temporary anonymous number provided by the subscriber. S-CSCF 121 may receive a call setup signaling message from the restaurant's endpoint device 105 via access network 108 and NE 111 with the temporary anonymous number as the called party ID. The S-CSCF may consult Application Server 112 and its associated database 115 in order to complete the call setup. The AS 112, in consultation with database 115, may determine that the called number is a temporary anonymous number which is assigned to endpoint device 102 (in this case, the subscriber's mobile endpoint device). Accordingly, the AS 112 may provide the service logic to S-CSCF 121 to effect the call to the subscriber mobile endpoint device. For example, the S-CSCF may substitute the permanent number of the mobile endpoint device 102 for the temporary anonymous number (e.g., in a field in the call setup signaling message) and forward the call setup signaling message to NE 109. NE 109 may in turn forward the message to the correct endpoint device (endpoint device 102) via access network 101. In this manner, two-way communication may be established between the subscriber's mobile endpoint device 102 and the restaurant's endpoint device 105. At all times, the restaurant uses the temporary anonymous number of the subscriber without needing to know the permanent number of the subscriber's mobile endpoint device.

Following step 250, the method terminates at step 295.

Returning to step 215, depending on the implementation, after sending a temporary anonymous number to a subscriber's mobile endpoint device, the method may alternatively proceed to step 260.

At step 260, the method 200 receives a request to obtain location information of a subscriber/mobile endpoint device in accordance with the temporary anonymous number. In an exemplary scenario, a subscriber who has been assigned a temporary anonymous number may call a third-party, such as a restaurant or coffee shop, and place an order for a pick-up. Additionally, the subscriber has provided the temporary anonymous number to the third-party. Accordingly, if necessary, the third-party may request location information of the subscriber using the temporary anonymous number. For example, the restaurant or coffee shop may wish to know when the subscriber is proximate to the restaurant in order to better prepare a meal or drink in a timely manner in anticipation of the subscriber's arrival based on the subscriber's current location. For example, a subscriber may have ordered a meal that takes 15 minutes to prepare, but the subscriber is situated approximately 30 minutes from the restaurant. The method allows the vendor to use the temporary anonymous number to gain access to location information of the subscriber's mobile endpoint device. In this manner, the vendor may start preparing the order when the subscriber is approximately 15 minutes from the vendor's establishment. This allows a vendor to streamline its operation in terms of fulfilling the orders not necessarily in the time sequences that the orders were placed, but instead in the sequence that the orders will be likely picked up. This will also better serve the subscribers because their orders may be time sensitive, such as food and drink orders, which should be made as close to the time that the orders are picked up to ensure freshness.

In one embodiment, a subscriber may call a number or SMS code designated by a vendor or third-party. For example, a business could subscribe to a service with an advertised number (e.g., an 800 number or a 4-5 digit SMS quick code/short code service) and the providing/dissemination of anonymous numbers could be managed by a communication network provider. In any event, the third-party may then request location information of the subscriber/mobile endpoint device. In one embodiment, the request may be a request to temporarily track the subscriber using the anonymous number and/or to receive location updates/alerts. This may be useful in situations where, for example, the vendor desires to ensure that the food or drink is as fresh as possible (e.g., a cup of coffee being as hot as possible, a cup of smoothie being as cold as possible, and so on) when the order is picked up from the vendor's establishment. In one embodiment, the request may comprise a call, a text message, an SMS message, MMS message and the like, that is received by a network service provider (e.g., by an interactive response system, such as an interactive voice response (IVR) system and the like).

At step 270, the method 200 determines if the temporary anonymous number has expired. Step 270 is similar to step 230 as previously discussed above. In one embodiment, the temporary anonymous number may have certain additional restrictions in the context of obtaining location information associated with subscriber. For example, the temporary anonymous number may be prohibited from being used to obtain location information and may only be used to establish two-way communication between a mobile endpoint device and a third-party caller. In other words, in one embodiment the subscriber will have to actively opt-in to this particular service feature before the location information will be disseminated to a third-party. In this case, the method will also determine whether a temporary anonymous number has "expired" for purposes of obtaining and providing location information.

If the method 200 determines at step 270 that the temporary anonymous number has expired, the method proceeds to step 280 where the request for location information is denied. For example, in one embodiment the method may provide a notification to the requester (for example, a restaurant or coffee shop attempting to track a subscriber using the temporary anonymous number) that the number is no longer in service and that location information cannot be accessed.

Following step 280, the method terminates at step 295. However, if at step 270 the method 200 determines that the temporary anonymous number has not expired, the method proceeds to step 290.

At step 290, the method 200 provides the location information of a subscriber's mobile endpoint device to the requester. The method may determine the location information of a subscriber/mobile endpoint device in various ways. For example, a subscriber may have a mobile endpoint device that is equipped with a mechanism for determining its own location, such as Global Positioning System (GPS) receiver and the like. Alternatively, the location information of a mobile endpoint device may be determined or estimated by using triangulation techniques (e.g., using one or more base stations, cell site antennas, etc.) or simply based upon the cell site currently serving the mobile endpoint device, for example. In one embodiment, the location information is determined by the access network or access point serving the mobile endpoint device (e.g., a Wi-Fi or IEEE 802.11 wireless access point, a WiMAX IEEE 802.16 wireless access point, etc.). In some instances the method may receive location information that is self reported by a mobile endpoint device, either periodically or upon request from the method. In other embodiments, the location of the mobile endpoint device is estimated or determined by one or more components of a communication network, such as AS 112 or other network elements in network 110 in FIG. 1. Regardless of the manner in which the location information is determined, the method provides this information to the requester.

In one embodiment, the location information is provided continuously or periodically for a predefined or predetermined period of time intervals (e.g., every five minutes, every ten minutes, etc.). In one embodiment, the method first confirms with the subscriber (e.g., via a message to and response from the subscriber's mobile endpoint device) that the location information may be provided to the particular requester. In other words, the subscriber may confirm the dissemination of the location information of the subscriber on a per session basis. In one embodiment, the method provides the location information only once per request. In one embodiment, the method provides the location information via an interactive system, such as an IVR system, and/or via a text message, email, voicemail, voice recording, SMS message, MMS message and the like (e.g., to an endpoint device of the third-party requester).

Advantageously, the method allows a subscriber to obtain certain services from a third-party in a more timely manner, without the subscriber having to sacrifice personal security or privacy by providing a permanent number of a mobile endpoint device. For example, a restaurant or coffee shop can have a hot meal or beverage accurately timed for a subscriber's arrival based upon the location information of the subscriber provided by the method at step 290. However, the third-party (e.g., the restaurant or the coffee shop) will not have the permanent ability to know the whereabouts of the subscriber or to even know the subscriber's true number (e.g., the permanent number of the subscriber's mobile endpoint device) once the transaction is completely. In other words, after the conclusion of the transaction the anonymous number will expire shortly and the establishment will no longer have a mechanism to track the user. Following step 290, the method terminates at step 295.

Although steps of the exemplary method 200 have been described as taking place at, or being performed by an application server, such as AS 112, or at a S-CSCF 121, some or all of the steps may take place at, or be performed by, any other component of IMS core network 110 in FIG. 1.

Figure 3:
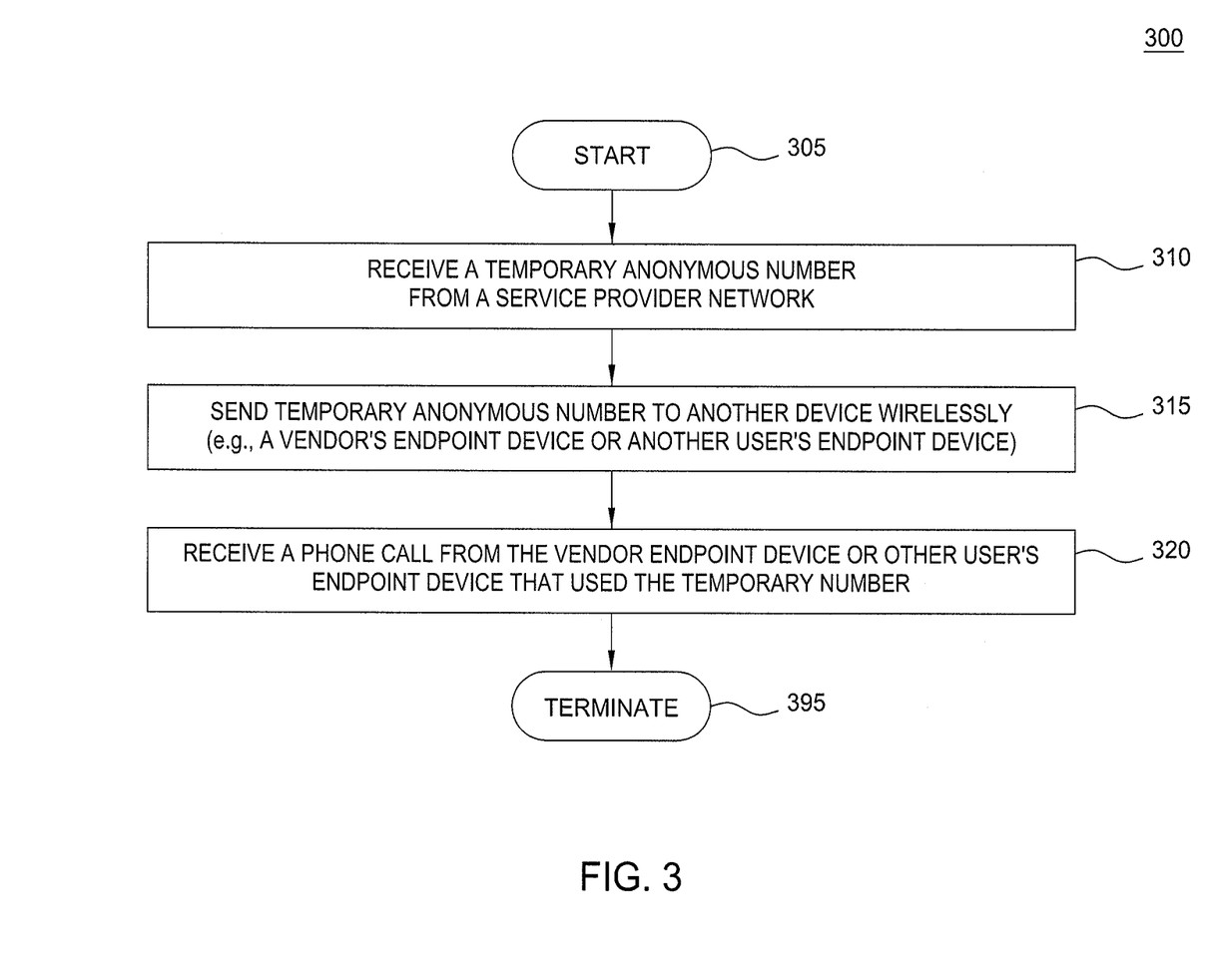
FIG. 3 illustrates another flowchart of a method for temporarily mapping an anonymous number to a mobile endpoint device.

FIG. 3 illustrates a flowchart of a method 300 for temporarily mapping an anonymous number to a mobile endpoint device. In one embodiment, one or more steps of the method 300 may be performed by a mobile endpoint device (e.g., a cellular phone, a mobile phone, a smart phone, and the like). In one embodiment, the mobile endpoint device may be equipped with a two-dimensional screen display, or like device, in order to support various functions described herein. In one embodiment, a user having such a mobile endpoint device may be a wireless network subscriber of a wireless network provider and may be subscribed to or enrolled in a temporary anonymous number service feature offered by the wireless network provider. The method begins in step 305 and proceeds to step 310.

At step 310, the method 300 receives a temporary anonymous number for use by a mobile endpoint device from a service provider network, such as the IMS Core Network 110 or an access network as shown in FIG. 1. For example, a user with a mobile endpoint device may subscribe to a temporary anonymous number service feature from his or her service provider network. Accordingly, in one embodiment the method may receive a temporary anonymous number from a service provider network. The temporary anonymous number may be received in response to a request (e.g., from a subscriber who has subscribed to a temporary anonymous number service feature). In another embodiment, the method receives the temporary anonymous number (e.g., from a service provider network) according to a schedule. For example, a new temporary anonymous number may be received by the method to use each day, each week, or any other time period. In still another embodiment, the method may receive a new temporary anonymous number when a temporary anonymous number previously assigned to a mobile endpoint device has expired. In one embodiment, the temporary anonymous number received at step 310 may be assigned an expiration based upon a number of uses or a time period for use. In one embodiment, the temporary anonymous number received may have a particular area code, which may be the area code in which a mobile endpoint device is currently located, a subscriber's home area code, or any other area code. The last option may allow a subscriber to appear to have a presence in an area that the subscriber is not otherwise connected to.

At step 320, the method 300 sends a temporary anonymous number to another device wirelessly. For example, a subscriber with a mobile endpoint device that is currently assigned a temporary anonymous number may desire to permit temporary two-way communication to be established between his or her mobile endpoint device and a third-party (e.g., a restaurant which has a wait for a table). Accordingly, the method may use various mechanisms of communication to send the temporary anonymous number to an endpoint device of the restaurant (e.g., broadly a point-of-sale (POS) device). For example, the method may send a communication conveying the temporary anonymous number via infrared, BLUETOOTH, RFID or any other suitable short-range wireless communication methods to an endpoint device of the third party.

Alternatively, the method may provide a bar-code or QR code (a type of two-dimensional bar-code) to an image or pattern recognition tool or scanner of an endpoint device of the restaurant (e.g., a bar-code scanner, or like device). For example, the information contained in the QR code or bar-code may comprise the temporary anonymous number of a subscriber's mobile endpoint device. In one embodiment, the method may provide the QR code or bar-code via a display, such as a display of mobile endpoint device, the output of which may be scanned and recognized by the restaurant's endpoint device if properly equipped. In one embodiment, the wireless communication may comprise a text message, automated voicemail, SMS message and/or MMS message to the third-party's endpoint device. In any event, following step 320, a third-party with whom a subscriber wishes to establish two-way communications for a certain limited period of time may begin to use the temporary anonymous number to reach the subscriber.

In another embodiment, the method may provide the temporary anonymous number to other persons to whom a subscriber would like to be accessible for a limited period of time. For example, a subscriber at a conference may wish to meet with certain other attendees at a later time during the conference, but does not want the other attendees to have his or her permanent mobile phone number. Accordingly, at step 320, the method may send a temporary anonymous number to a wireless endpoint device of another person in the same manner described above with respect to sending the temporary anonymous number to a third-party endpoint device (e.g., a restaurant's POS device). In this regard, it should also be noted that the foregoing scenarios are only provided for illustrative purposes, and numerous other social situations may be apparent in which aspects of the present disclosure could be employed advantageously.

At step 330, the method 300 receives a phone call from the third-party endpoint device or other mobile endpoint device that was provided with the temporary anonymous number. For example, a restaurant or a conference attendee to whom the method sent a temporary anonymous number may attempt to place a call to a subscriber's mobile endpoint device using the temporary anonymous number provided. The call request may be conveyed via a service provider network, such as the IMS core network 110 in FIG. 1, and any one or more access networks, which may comprise wireless access networks, such as access networks 101 and 108.

For example, the restaurant or conference attendee may attempt a call via endpoint device 105 using the temporary anonymous number to place the call. Accordingly, the IMS core network 110 will receive an associated call setup signaling message and determine the call should be forwarded to endpoint device 102, which is currently assigned the temporary anonymous number in the call setup signaling message. The service provider network may perform various processing on the call request (e.g., substituting the permanent number of endpoint device 102 into the call signaling message) and forward the call to endpoint device 102 via NE 109 and access network 101. For example, Application Server 112 and/or S-CSCF 121 may modify call signaling messages and call data to the third-party's endpoint device 105 to mask the permanent number of the mobile endpoint device 102. The method 300 may therefore receive this call signaling message (e.g., at endpoint device 102). However, from the perspective of endpoint device 105 placing the call, the third-party caller (e.g., the restaurant or conference attendee) never obtains the permanent number of mobile endpoint device 102. Method 300 then ends in step 395.

It should be noted that although not specifically specified, one or more steps of methods 200 and 300 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIGS. 2 and 3 that recite a determining operation or involve a decision do not necessarily require that both branches of the determining operation be practiced. In other words, one of the branches of the determining operation can be deemed as an optional step.

Figure 4:
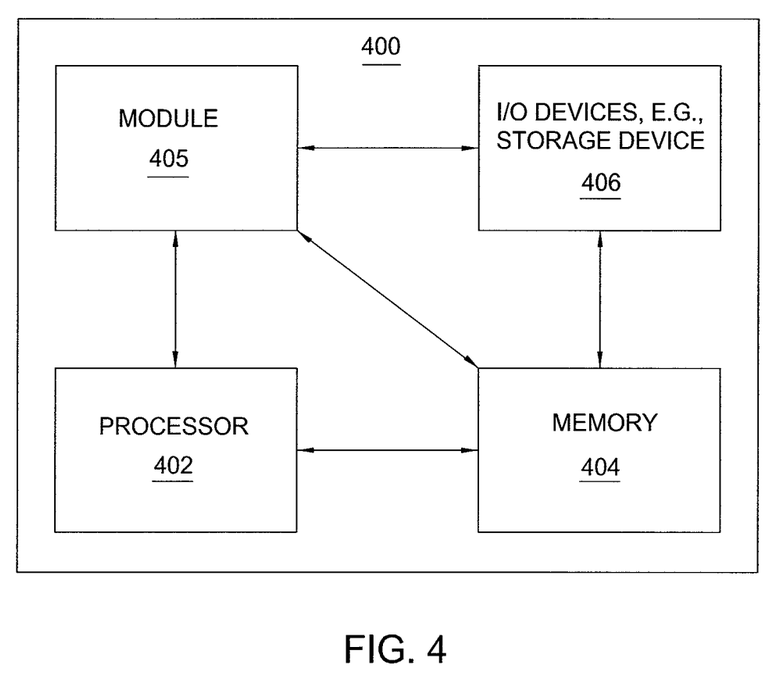
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for temporarily mapping an anonymous number to a mobile endpoint device, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 405 for temporarily mapping an anonymous number to a mobile endpoint device can be loaded into memory 404 and executed by processor 402 to implement the functions as discussed above. As such, the present method 405 for temporarily mapping an anonymous number to a mobile endpoint device (including associated data structures) of the present disclosure can be stored on a computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for using an anonymous number associated with a mobile endpoint device in a communication network, comprising:
    establishing, by at least one processor in the communication network, a temporary anonymous number service for a vendor;
    receiving, by the at least one processor, a request from the mobile endpoint device having a mobile number, for a first temporary anonymous number, wherein the request is directed to the temporary anonymous number service, wherein the vendor bears a cost for the temporary anonymous number service;
    assigning, by the at least one processor, the first temporary anonymous number to the mobile endpoint device, wherein the assigning is in response to the request for the first temporary anonymous number from the mobile endpoint device to the temporary anonymous number service;
    receiving, by the at least one processor, a request from the vendor for location information for the mobile endpoint device in accordance with the first temporary anonymous number;
    providing, by the at least one processor, the location information for the mobile endpoint device to the vendor when the first temporary anonymous number has not expired;
    receiving, by the at least one processor, a call request from the vendor to reach the mobile endpoint device in accordance with the first temporary anonymous number, wherein the vendor is not provided with the mobile number; and
    forwarding, by the at least one processor, the call request to the mobile endpoint device when the first temporary anonymous number has not expired, wherein the forwarding the call request comprises mapping the first temporary anonymous number to the mobile number in a database.

2. The method of claim 1, wherein the communication network comprises an internet protocol multimedia subsystem network.

3. The method of claim 2, wherein the communication network further comprises a wireless network.

4. The method of claim 1, wherein the forwarding the call request further comprises substituting the mobile number for the first temporary anonymous number in a call setup signaling message.

5. The method of claim 1, wherein the first temporary anonymous number expires after a predefined number of uses.

6. The method of claim 1, further comprising:
    sending the first temporary anonymous number to the mobile endpoint device.

7. The method of claim 6, further comprising:
    sending a second temporary anonymous number to the mobile endpoint device when the first temporary anonymous number has expired.

8. The method of claim 1, wherein the first temporary anonymous number expires after a predefined time period.

9. A method for using an anonymous number associated with a mobile endpoint device in a communication network, comprising:
    assigning, by at least one processor, a first temporary anonymous number to a mobile endpoint device having a mobile number, wherein the first temporary anonymous number is assigned in response to a request directed to a temporary anonymous number service provided by the at least one processor for a vendor, wherein the mobile endpoint device is a device of a customer of the vendor;
    receiving, by the at least one processor, a request from the vendor for location information for the mobile endpoint device in accordance with the first temporary anonymous number; and
    providing, by the at least one processor to the vendor, the location information for the mobile endpoint device when the first temporary anonymous number has not expired, wherein the first temporary anonymous number expires after a predefined time period, wherein the providing the location information comprises mapping the first temporary anonymous number to the mobile number in a database.

10. The method of claim 9, wherein the communication network comprises an internet protocol multimedia subsystem network.

11. The method of claim 10, wherein the communication network further comprises a wireless network.

12. The method of claim 9, wherein the first temporary anonymous number further expires after a predefined number of uses.

13. The method of claim 9, further comprising:
    sending the first temporary anonymous number to the mobile endpoint device.

14. The method of claim 13, further comprising:
    sending a second temporary anonymous number to the mobile endpoint device when the first temporary anonymous number has expired.

15. A method for using an anonymous number associated with a mobile endpoint device in a communication network, comprising:
    requesting, by the mobile endpoint device, a first temporary anonymous number from a temporary anonymous number service of the communication network provided to a vendor, wherein the temporary anonymous number service is previously established by the communication network for the vendor, wherein the vendor bears a cost for the temporary anonymous number service;

receiving the first temporary anonymous number by the mobile endpoint device from the communication network, wherein the mobile endpoint device has a mobile number; and sending the first temporary anonymous number by the mobile endpoint device wirelessly to a device of the vendor, wherein the vendor is not provided with the mobile number.

16. The method of claim 15, further comprising:

receiving a call from the device of the vendor in accordance with first temporary anonymous number.

17. The method of claim 15, wherein the device of the vendor comprises a point of sale device.

18. The method of claim 15, wherein the first temporary anonymous number expires after a predefined number of uses.

19. The method of claim 18, further comprising:

sending a second temporary anonymous number to the mobile endpoint device when the first temporary anonymous number has expired.

* * * * *